(12) United States Patent
Caine et al.

(10) Patent No.: US 7,794,688 B2
(45) Date of Patent: Sep. 14, 2010

(54) MAGNESIUM OXYCHLORIDE CEMENT

(75) Inventors: George Eccles Caine, Salt Lake City, UT (US); Charles W. Ellis, Salt Lake City, UT (US)

(73) Assignee: Maya Magstone, Inc., Salt Lake City, UT (US)

( * ) Notice: Subject to any disclaimer, the term of this patent is extended or adjusted under 35 U.S.C. 154(b) by 0 days.

(21) Appl. No.: 12/687,017

(22) Filed: Jan. 13, 2010

(65) Prior Publication Data

US 2010/0112229 A1 May 6, 2010

Related U.S. Application Data

(62) Division of application No. 11/936,717, filed on Nov. 7, 2007, now Pat. No. 7,658,795.

(60) Provisional application No. 60/866,184, filed on Nov. 16, 2006.

(51) Int. Cl.
C01F 5/30 (2006.01)
C04B 9/02 (2006.01)

(52) U.S. Cl. ............ 423/635; 423/636; 423/639; 106/685; 106/688; 106/801

(58) Field of Classification Search .......... 423/635, 423/636, 639; 106/685, 688, 801
See application file for complete search history.

(56) References Cited

U.S. PATENT DOCUMENTS

| 3,963,849 A | * | 6/1976 | Thompson | 428/182 |
| 5,004,505 A | * | 4/1991 | Alley et al. | 106/685 |
| 2007/0017418 A1 | * | 1/2007 | Dennis | 106/685 |

* cited by examiner

*Primary Examiner*—Paul Marcantoni
(74) *Attorney, Agent, or Firm*—Holme Roberts & Owen LLP

(57) ABSTRACT

Magnesium oxychloride cement is formed by mixing a magnesium chloride ($MgCl_2$) brine solution with a magnesium oxide (MgO) composition in a selected stoichiometric ratio of $MgCl_2$, MgO, and $H_2O$ that forms the 5 phase magnesium oxychloride cement composition. Although Sorel cements formed from the mixture of $MgCl_2$, MgO can form a variety of compounds, the inventive systems and methods provide for controlling the cement kinetics to form the five phase magnesium oxychloride cement composition and results in an improved and stable cement composition. Various fillers can be optionally added to form preferred cement materials for uses as diverse such as road stripping, fire-proofing, fire barriers, cement repair, and mortar.

20 Claims, No Drawings

MAGNESIUM OXYCHLORIDE CEMENT

CROSS-REFERENCE TO RELATED APPLICATIONS

This application is a divisional application that claims the benefit of U.S. Non-Provisional patent application Ser. No. 11/936,717, entitled "Magnesium Oxychloride Cement" and filed on Nov. 7, 2007 that, in turn, claims the benefit of U.S. Provisional Application No. 60/866,184 entitled "Magnesium Oxychloride Cement" and filed on Nov. 16, 2006, each of which is incorporated herein by this reference for all purposes.

BACKGROUND OF THE INVENTION

1. The Field of the Invention

The present invention relates to the fields of cement compositions and products. More particularly, the present invention relates to improved magnesium oxychloride cement compositions.

2. The Relevant Technology

Cement and cementitious products affect everyone, from the roads we drive on, to the buildings we work in, to the homes we live in. Early principles and applications of cement and cement products were known anciently. The Romans, for example, developed cements and cement products to a high degree of sophistication. Despite centuries of knowledge concerning cements and cement products and despite countless variations of cement compositions, problems still arise while using cements which heretofore have not been adequately solved.

One of the most important uses of cement compositions is in concrete. As used herein, the term "concrete" is broadly defined as a hard strong building material made by mixing an aqueous solution-cementitious powder mixture with a mineral aggregate, often sand and gravel. The cement acts as a glue to bind the aggregate particles together. The setting time and physical properties of concrete vary depending on the cement composition and upon the choice of aggregates.

Concrete is commonly used to construct driveways, sidewalks, floors, and roads (hereinafter referred to generically as "road surfaces"). Concrete road surfaces are usually constructed of Portland cement as a mixture of calcium oxide and water with gravel as an aggregate. Although Portland cement is the industry standard, it is generally slow setting and requires a substantial cure time to reach an acceptable strength. In fact, it has been estimated that Portland cement does not reach full strength for about 100 years.

Sorel cement is another common type of cement. It is a hydraulic cement mixture of magnesium oxide (burnt magnesia) with magnesium chloride together with aggregate materials like sand or crushed stone. Conventional Sorel cement has a poor resistance to water, making it unsuitable for many applications, but is widely used for use in grindstones, tiles, artificial stone (cast stone), cast floors, and even artificial ivory (e.g. for billiard-balls). Magnesia cement floors are credited a high resistance to wear.

Sorel cement is produced by mixing a $MgCl_2$ brine solution with MgO powder. Conventional Sorel cement has a weight ratio 2.5-3.5 parts MgO to one part $MgCl_2$. There is considerable controversy as to what chemical reaction is responsible for the setting reaction of Sorel cement. In the literature, there are several setting reactions presented. The two most prominent are the formation of a 5-phase hydrated magnesium oxychloride product ($5Mg(OH)_2 \cdot MgCl_2 \cdot 8H_2O$) and a 3-phase hydrated magnesium oxychloride product ($3Mg(OH)_2 \cdot MgCl_2 \cdot 8H_2O$), each formed according to Equations 1 and 2 below, respectively.

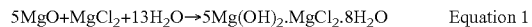

$$5MgO + MgCl_2 + 13H_2O \rightarrow 5Mg(OH)_2 \cdot MgCl_2 \cdot 8H_2O \quad \text{Equation 1}$$

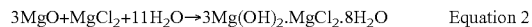

$$3MgO + MgCl_2 + 11H_2O \rightarrow 3Mg(OH)_2 \cdot MgCl_2 \cdot 8H_2O \quad \text{Equation 2}$$

Other potential setting reactions discussed include the formation of 2-phase ($2Mg(OH)_2 \cdot MgCl_2 \cdot 4H_2O$), 9-phase ($9Mg(OH)_2 \cdot MgCl_2 \cdot 5H_2O$), $Mg(OH)_2$ and $MgCl_2 \cdot 6H_2O$. In addition to the confusion over the setting reaction, there is a lack of knowledge of the kinetics of the setting reaction and the resulting strength of cements made under different conditions. Further details regarding Sorel cements can be found in U.S. Pat. Nos. 5,004,505 and 5,110,361 to Russell I. Alley and George E. Caine, both of which patents are incorporated herein by reference in their entireties.

BRIEF SUMMARY OF THE INVENTION

The present invention is directed to improved Sorel cement (magnesium oxychloride) compositions and products. The inventive cement compositions can be used for a variety of purposes, from conventional use in repairing damaged concrete surfaces and coating substrates with a stucco-like surface to fireproofing underlying materials, forming fire proof layers and fire barriers such as fire barrier doors, and providing durable traffic paint.

The present invention represents an improvement on conventional Sorel cement systems. As previously noted, the basic Sorel system includes calcined magnesia (MgO, also known as magnesium oxide) mixed with an aqueous solution of magnesium chloride ($MgCl_2$). In the present invention, the ratio of magnesium oxide to magnesium chloride in the cement composition is carefully controlled to ensure that the proper reaction pathway occurs so that durable and strong Sorel cement results.

By way of example, the use of brine from the Great Salt Lake as a source of magnesium chloride results in a cement composition which is not only less expensive than cement compositions made from pure magnesium chloride solutions, but also substantially stronger.

Accordingly, a first example embodiment of the invention is a method for forming a cementitious composition. The method generally includes: providing a first volume of a magnesium chloride ($MgCl_2$) brine solution; providing a second volume of a magnesium oxide (MgO) composition, the second volume and the first volume having a weight ratio that is based upon their respective concentrations and is selected to provide sufficiently stoichiometric ratios of $MgCl_2$, MgO, and $H_2O$ to preferably form a magnesium oxychloride cement composition according to the 5 phase reaction: $5MgO + MgCl_2 + 13H_2O \rightarrow 5Mg(OH)_2 \cdot MgCl_2 \cdot 8H_2O$; and mixing the first volume with the second volume to form the magnesium oxychloride cement mixture. The magnesium chloride brine solution preferably has a specific gravity in the range from about 28° Baume to about 34° Baume, more preferably at least about 30° Baume. The brine solution is preferably Great Salt Lake brine having impurities ranging from about 1% to about 5% as illustrated by example elsewhere herein. The magnesium oxide composition also contains salt or mineral impurities other than magnesium oxide, the total amount of the impurities being in the range from about 5% to about 20% of the magnesium oxide composition. The method also optionally includes adding one or more filler materials with the magnesium oxychloride cement composition mixture.

Another example embodiment is a cementitious material formed of a magnesium oxychloride cement comprising at least about 80% of the 5 phase compound $5Mg(OH)_2 \cdot MgCl_2 \cdot 8H_2O$ after 24 hours, more preferably at least about 90% of the 5 phase compound after 24 hours, still more preferably at least about 98% of the 5 phase compound after 24 hours. The cementitious material can be advantageously used in a number of applications as disclosed herein, for example as a fire proof coating. In other words, embodiments of the invention minimize the amount of poorly water resistant $MgCl_2 \cdot 6H_2O$ formed from a 3 phase reaction.

In another example embodiment of the invention, a cementitious material includes: a magnesium oxychloride cement produced by combining ingredients in a selected ratio. The ingredients include: a magnesium chloride brine solution at a first weight percent of the magnesium oxychloride cement, the brine solution having a specific gravity in the range of from about 27° Baume to about 34° Baume, a magnesium oxide composition at a second weight percent of the Sorel cement, and one or more filler materials mixed with the magnesium oxychloride cement. The ratio of the first weight percent to the second weight percent is selected to provide substantially stoichiometric ratios of $MgCl_2$ and $H_2O$ to MgO to form a magnesium oxychloride cement composition according to the 5 phase reaction:

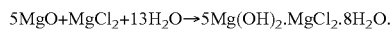
$$5MgO + MgCl_2 + 13H_2O \rightarrow 5Mg(OH)_2 \cdot MgCl_2 \cdot 8H_2O.$$

Another example embodiment is a fire barrier door formed of a door frame having front and back surfaces and a cement core between the front and back surfaces, the cement core comprising magnesium oxychloride cement comprising at least about 80% of the 5 phase compound $5Mg(OH)_2 \cdot MgCl_2 \cdot 8H_2O$ and a lightweight filler.

These and other objects and features of the present invention will become more fully apparent from the following description and appended claims, or may be learned by the practice of the invention as set forth hereinafter.

DETAILED DESCRIPTION OF THE PREFERRED EMBODIMENTS

The present invention is directed to improved magnesium oxychloride cement compositions and products formed therefrom having improved strength and durability. The improved cements are formed of improved magnesium oxychloride (also known as Sorel cement) compositions and products. The disclosed products and methods represent an improvement on conventional Sorel cement systems, which include calcined magnesia (MgO, also known as magnesium oxide) mixed with an aqueous solution of magnesium chloride ($MgCl_2$). In the present invention, the ratio of magnesium oxide to magnesium chloride in the cement composition is carefully controlled to ensure that the proper reaction pathway occurs so that durable and strong cement results.

The following disclosure includes discussions on compositions, methods, example embodiments of the invention, and finally a few examples. In the following description, numerous specific details are set forth in order to provide a thorough understanding of the present invention. It will be obvious, however, to one skilled in the art that the present invention may be practiced without these specific details. In other instances, well-known aspects of cementitious compositions and construction techniques have not been described in particular detail in order to avoid unnecessarily obscuring the present invention.

It will be appreciated by those skilled in the art, in view of the disclosure herein, that the present invention provides cement compositions which possess a high structural strength, and yet have a high bonding strength to common substrates. The cement compositions set relatively fast, but do not set so fast as to prevent adequate "working" of the compositions to form the desired end product. The present invention also provides cement compositions which do not shrink upon setting in order that a good bond can be formed with the adjacent surface, such as when used to repair deteriorating concrete road surfaces. The cement compositions are also resistant, for example, to heat and flame, weather exposure, ultraviolet rays, and deicing salts.

I. Compositions

The inventive cement compositions are generally formed from magnesium oxychloride in an aqueous solution, magnesium oxide, and optionally one or more filler materials, each as discussed below.

A. Magnesium Chloride

Magnesium Chloride ($MgCl_2$) is preferably provided in solution with the water necessary for the cement formation when mixed with MgO. According to the invention it has been found that the magnesium chloride solution should have a specific gravity in the range of from about 28° to about 34°, more preferably at least about 30°. Slight disparities between optimum values of specific gravity and proportions of ingredients may be permissible. Nevertheless, it is preferable that the specific gravity of the gauging solution be maintained within a suitable range to ensure the proper stoichiometric ratio is used to form the preferred five phase reaction product.

When the specific gravity of the solution exceeds the suitable range (that is, the solution has a very high degree Baume) the excess magnesium chloride will tend to absorb the moisture from the atmosphere causing the surface of the cement to expand slightly or otherwise become irregular. Similarly, if the specific gravity of the magnesium chloride solution is below the suitable range, then there will either be unreacted magnesium oxide present which will tend to combine with water in the solution to form free magnesium hydroxide or there will be excess water which must evaporate, slowing the curing time of the cement. Magnesium hydroxide forms an impervious surface layer on the magnesium oxide particles preventing further five phase reaction. Therefore, if an excessive amount of magnesium hydroxide is present, fissures and cement weakening tend to occur rendering the quality of the concrete unacceptable.

A particularly preferred source of $MgCl_2$ is a concentrated brine solution from the Great Salt Lake. The Great Salt Lake brine not only is significantly less expensive than known magnesium chloride solution sources, but also results in a cement composition possessing unexpectedly higher strength. Although it is not intended to limit the present invention to any specific theory of action or mechanism, it is believed that existence of salts and mineral elements other than magnesium chloride in the brine solution synergistically react with the magnesium oxide producing the higher strength cement composition. Table 1 illustrates a typical composition of Great Salt Lake brine.

TABLE 1

| GSL Brine | |
|---|---|
| Component | Weight Percent |
| $MgCl_2$ | 30.00 to 34.00% |
| Sulfate ($SO_4^{-2}$) | 0.0 to 3.5% |
| Potassium (K) | 0.0 to 0.7% |
| Sodium (Na) | 0.0 to 0.7% |
| Water | Balance |

B. Magnesium Oxide

Magnesium oxide (MgO) can be provided in any of the various compositions conventionally used to for magnesium oxychloride cements, depending on the particular application. For example, a pure analytical reagent grade MgO can be obtained with a purity of 99.999%. More generally, a very highly reactive technical grade MgO composition of at least 98% finely sized high purity MgO can be used in chemical process applications where a rapid reaction rate is necessary. Magnesium oxide of this purity is not necessary and may not be financially preferable for many applications, however. More preferably, an industrial grade product can be obtained. For example, an industrial grade MgO composition with a makeup as identified in Table 2 below can be used.

TABLE 2

Example Industrial MgO Composition

| Component | Weight Percent |
|---|---|
| MgO | 85.6% |
| CaO | 2.7% |
| $SiO_2$ | 2.1% |
| LOI ($H_2O$) | 4.5% |
| $Fe_2O_3$ | 0.6% |
| $Al_2O_3$ | 0.5% |
| $SO_3$ | 4.0% |

There may also be other trace metals in this material as it is a calcined natural mineral. It is generally preferred that the used MgO composition have a weight percent of MgO of at least 80%, although this is not necessary provided that that the actual weight percent of MgO in the MgO composition is accounted for in determining the proper ratio of MgO to $MgCl_2$ and $H_2O$ to be mixed to achieve desired stoichiometric ratios.

C. Fillers

The choice of fillers added to magnesium oxychloride cement determines the suitable uses for the resulting product. As used herein, the term "filler" includes within its meaning all materials that are not the magnesium oxychloride cement or its precursors, including for example "aggregates," which are inert materials that add a desired mechanical property, and other materials such as tints. In some cases no filler is necessary where the cement can be applied directly, for example as a fireproof coating. In others examples uses, however, the filler can add a valuable strength or volume to the cement. For example, very light weight aggregates such as expanded polystyrene beads, perlite, pumice, volcanic ash, vermiculite, zircon sands, high alumina sands, etc. are suitable for lightweight insulation-type uses, whereas very dense aggregates such as silica sands are suitable for concrete surface repair uses. The magnesium oxychloride cement compositions within the scope of the present invention may be used with both organic and inorganic (mineral) aggregates, including common soil. Examples of organic fillers include wood flour, wood chips, and saw dust. Tints such as yellow pigments and titanium dioxide (white) can be used to effect a desired color as well.

Common mineral aggregates can be used and are graded depending upon the size of the aggregate. The grading is typically a number corresponding to the number of divisions or meshes per inch of a large screen. The well known Tyler Mesh scale can be used. Generally, in grading the mineral aggregates, a number is assigned to the size of aggregate which will pass through the numbered mesh screen, but not the next smaller sized screen.

Specific sizes of mineral aggregate referred to in this specification are intended to be purely exemplary and should not be viewed as a limitation to the precise size mentioned. For example, a reference to #8 silica sand is intended to include those sizes substantially the same as #8 silica sand such as those aggregates having size in the range from about #6 to about #10. Similarly, specific size ranges referred to in this specification such as silica sand having a range from about #8 to about #70 may include #8, #16, #30, #70, or any other standard gradation therebetween. A non limiting set of examples of aggregate materials are listed in Table 3 below.

TABLE 3

Example Filler Characteristics

| Material | Bulk Density (gm/mL) | Void Fraction |
|---|---|---|
| Sand #1 | 1.383 | 0.4267 |
| Sand #2 | 1.400 | 0.5475 |
| Lightweight Volcanic | 0.383 | 0.4750 |
| Lightweight Volcanic Ash #1 | 0.600 | 0.5667 |
| Lightweight Volcanic Ash #2 | 0.600 | 0.4700 |
| Expanded Shale | 0.875 | 0.4538 |

II. Methods

As previously noted, conventional Sorel cements are formed by mixing MgO and $MgCl_2$. It has been found that a particular refinement of the method provides for an improved cement product, which has been determined to be the five phase reaction product. Generally, the preferred method includes first providing a magnesium chloride ($MgCl_2$) brine solution and a dry magnesium oxide (MgO) composition in a selected ratio, for example a weight ratio. This ratio is based upon their respective concentrations and is adjusted to provide sufficiently stoichiometric ratios of $MgCl_2$, MgO, and $H_2O$ to preferably form a magnesium oxychloride cement composition according to the 5 phase reaction:

$$5MgO + MgCl_2 + 13H_2O \rightarrow 5Mg(OH)_2 \cdot MgCl_2 \cdot 8H_2O$$

Depending upon the desired quality of product in terms of the percent phase product that is formed and the $MgCl_2$ and MgO source, and assuming a brine solution having a magnesium chloride a specific gravity in the range of from about 28° to about 34°, this ratio may be as broad as from about 1.1:1 to about 1.9:1 by weight, but is more preferably from about 1.3:1 to about 1.7:1, and still more preferably is about 1.46:1. For ease of use in industry, the 1.46:1 ratio can be expressed as about one gallon of GSL brine to about 7.5 pounds of an approximately 85% MgO composition.

After the $MgCl_2$ and MgO are provided, they are preferably mixed thoroughly in the appropriate ratio without any fillers for a period of preferably at least about 1 minute, more preferably from about five minutes to about seven minutes. One or more filler materials are optionally then admixed before the mixed $MgCl_2$ and MgO finalize setting. Thorough mixing of the magnesium oxychloride cement compositions within the scope of the present invention is important to consistently obtain a complete chemical reaction. A mortar type mixer is preferably used with fine particulate fillers. Many suitable products can be formed with an approximately 1:1:2 ratio by volume of brine: MgO composition: aggregate, using brine, MgO, and aggregate formulations as described herein. The precise amount of aggregate may vary greatly, however, based on the application.

When ambient temperature is above 85 degrees Fahrenheit, it is recommended that the mixer, transporting and/or pumping equipment, and placing tools should be cleaned and flushed with water every two or three hours. If the magnesium oxychloride cement compositions are allowed to dry on steel, it is difficult and time consuming to remove. When the temperature is 100 degrees Fahrenheit or more it is advisable to chill the magnesium oxychloride solution, use a canopy over the mixer, and keep the aggregate in the shade. Similarly, in cold conditions it may be necessary to heat the $MgCl_2$ solution to ensure all the $MgCl_2$ is in solution and not precipitated due to the cold, which can result in precipitated $MgCl_2.6H_2O$ crystals.

It has been determined that the setting reaction initially takes about four hours, but additional setting can continue for up to 72 hours or more. Because complete setting takes a number of hours, where no or limited fillers are added, the mixed but unset cement can be applied to various surfaces by methods similar to painting such as by coating, dipping, brushing, spraying, and the like. The liquid mixture can also be arranged into a desired shape before setting as well, for example by molding or application to a desired space or surface.

III. Applications

The inventive cement compositions can be used for a variety of purposes, from conventional use in repairing damaged concrete surfaces and coating substrates with a stucco-like surface to fireproofing underlying materials such as insulation, providing fire proof insulation layers, or providing durable road striping.

For example, the inventive cement compositions can be used as a fire resistant coating on combustible materials. In one embodiment, freshly mixed MgO and $MgCl_2$ can be applied directly by brushing, dipping or spraying to the underlying material that is to be protected. For example, the freshly mixed cement can be brushed, dipped, or sprayed onto a soundproof foam or other insulation that is particularly combustible and emits toxic chemicals upon combustion. Although the cement coating will not ultimately stop the foam from combusting if exposed to enough heat for a long enough time, it may prevent the foam from rapidly catching fire from a spark and will slow the spread of fire across the foam. Of course, a filler such as perlite and optionally additional fillers such as inorganic pigments can be added.

As another example, a large amount of a suitable filler, for example at least about 50%, preferably from about 50% to about 75%, of perlite can be admixed so that a half inch or more thick layer can be added to provide a more persistent fire proofing layer. Such a thick layer could have applications in protecting steel beams in high rise construction, for example.

As another example, the cement compositions can be admixed with a light weight filler such as expanded polystyrene beads to form a lightweight yet thick fire proof insulation. By way of example, such a filler will be at least about 40% of the fire proof insulation cement, more preferably from about 50% to about 75%. Such a lightweight fire proof layer could have particular utility as a filler in fire barrier doors to inexpensively increase the fire rating of the door. In this embodiment, the cement can be either added to a door core while the cement is still flowable or it can be molded to a suitable shape and added to the door during assembly.

As another example, traffic marking paints such as road stripes can be formed using the inventive cements with fillers such as silica sand and glass beads. Other reflective agents and pigments as are known in the art can also be added to provide the desired color, hue, consistency, and any other desired characteristic. An example composition includes mixed MgO and $MgCl_2$, silica sand, and glass in an approximately 1:1:1 ratio by weight with a small amount of pigments such as titanium dioxide (white). Variations on this example and methods of applying the traffic marking paint on streets will be apparent to those skilled in the art in view of the disclosure herein. One advantage of the inventive methods and compositions is that the use of preferred oxide pigments does not result in the release of harmful volatile organic gasses.

The high bond strength makes magnesium oxychloride cement compositions within the scope of the present invention ideally suited for concrete repair, mortar, and stucco applications. A major problem with existing concrete repair compositions is that the bond between the composition and the existing concrete is relatively weak. Similarly, existing stucco compositions require stucco wire for support.

In contrast to existing stucco compositions, the stucco compositions within the scope of the present invention may be applied directly to the substrate without stucco wire or paper. Conventional wisdom teaches that stucco wire and some moisture barrier, such as Kraft paper, exist between the stucco composition and the substrate. The stucco wire is for support and the barrier is to separate the rigid stucco composition from the substrate. The reason why current stucco compositions are preferably separated from the substrate is because many stucco substrates expand, contract, or flex to one degree or another over time. Such movement of the substrate would cause typical stuccos to crack or fail if applied directly to the substrate.

It has been found that the magnesium oxychloride cement stucco compositions within the scope of the present invention flex sufficiently to permit them to be applied directly to substrates without fear of subsequent cracking. Due to this high flexibility combined with high bondability, the stucco compositions within the scope of the present invention do not require stucco wire or paper, unless required by local building codes, but may be applied directly to the substrate surface where the wall structure provides a moisture barrier, or where the structure use does not require it. As a result, they may be applied faster and at a reduced cost than conventional stuccos.

Moreover, the stucco compositions within the scope of the present invention may be applied in a single coat as opposed to multiple coats required by currently known stucco compositions. Because of the high strength and low water absorbence of less than 5%, the stucco compositions of the present invention may be applied with a thickness reduced to ⅜ inch in moderate climates. Furthermore, it has been found that the stucco compositions within the scope of the present invention do not "photograph" underlying mortar joints when applied over concrete blocks.

The stucco compositions within the scope of the present invention may be sprayed onto the substrate surface or troweled. Generally, to be sprayed the stucco composition should have a lower viscosity than a troweled stucco composition. This can be achieved by reducing the amount of added aggregate relative to the other components.

The magnesium oxychloride cement compositions within the scope of the present invention are also particularly adapted for casting various ornamental and functional products. For example, landscaping products including precast post and panels for fencing, stepping stones, lawn edging, slope protectors, cast fountains, ornaments, splash blocks, shrub and flower pots, etc. can be produced from the cement compositions of the present invention. A variety of other products including hollow building blocks, slabs, bricks, parking lot bumpers, meter boxes, mantel and hearth stones, terrazzo, burial vaults, porcelain finish castings, light weight insulating, and fireproof products, etc. may also be produced by the cement compositions within the scope of the present invention.

As discussed above, the choice of aggregates determines the type of products which may be produced by the cement compositions. For example, if the castable product does not require high strength or other special characteristics, inexpensive aggregates may be used in connection with a "lean" cement mixture. On the other hand, if the cement product is to have a porcelain-like finish, then higher quality aggregates and controlled cement compositions are important.

For large castings where semi rough or rough surfaces are acceptable, coarse aggregate up to pea gravel or ⅜ inch size will provide high strength and low absorption. For small, delicate or intricate castings, aggregate sizes comparable to about #30 or finer would be required. In some instances a maximum size aggregate of #50 or #70 would be required for very detailed castings.

For instance, when a large vase or urn is cast and it is desired to have the aggregate show on the surface, #8 aggregate would be used. For this type is casting where a smooth, bubble-free surface is desired, it has been found that vibrating eliminates any air bubbles which might otherwise form on the surface. In the process, the aggregate is forced to the outside surface against the mold and any air bubbles at the surface are forced to the interior of the casting. The use of a vacuum chamber to de-gas can also be used.

It has been found that different sized aggregate particles containing #8 and #16 silica sand included in the castable concrete composition within the scope of the present invention produces high quality castings of both functional and ornamental products. In the case of castings having a porcelain-like finish, there is no need for firing or glazing the product. It has also been found that an exceptionally smooth and accurate casting may be achieved by including smaller sized silica sand, such as #70 and #200 silica sand, into the castable concrete composition.

The following examples further illustrate certain properties and characteristics of the magnesium oxychloride cement compositions within the scope of the present invention. These examples are intended to be purely exemplary of the use of the invention and should not be viewed as a limitation on any claimed embodiment.

EXAMPLES 1-2

A magnesium oxychloride cement was formed by the methods disclosed elsewhere herein with an approximately 32.6° GSL brine and an 85.6% MgO composition with no fillers. Two panels of plywood were provided and one was brush coated with a thin layer of the wet magnesium oxychloride cement and the cement was allowed to cure.

The two panels of plywood were place vertical and a flame from a propane torch was applied to each panel. It was empirically observed that the uncoated panel quickly ignited and the flame spread across the panel. The coated panel, however, did not readily ignite, even under a steady flame. Eventually, a steady flame applied to a point on the coated plywood resulted in localized combustion, but a spreading flame did not occur. Similarly, when the flame was applied to the top edges of the panels, it was observed that the flame spread along the top surface of the uncoated panel but did not spread on the top surface of the coated panel.

Next, two pieces of sound proof foam were provided and one was coated with the wet magnesium oxychloride cement and allowed to cure. Flame from a propane torch was applied to each foam piece. The uncoated foam piece quickly burst into flame upon contact from the propane torch flame while the coated foam piece did not.

Example 3

The reaction kinetics of cement were evaluated as follows. Magnesium chloride brine was obtained from two sources. One "pure" brine was prepared from deionized water and analytical reagent grade $MgCl_2 \cdot 6H_2O$ crystals with a purity of 99.99%. An industrial "impure" Great Salt Lake brine was also obtained. This industrial brine had the manufacturing specifications noted hereinabove.

Magnesium oxide (MgO) was obtained came from two sources. One was an ultra pure analytical reagent grade MgO with a purity of 99.999%. The other MgO was an industrial product MgO. A scanning electron microscope (SEM) with energy dispersive x-ray analysis (EDAX) analysis of the industrial product MgO Powder is as follows:

TABLE 4

| Element | Wt % | Mol % |
|---|---|---|
| MgO | 84.47 | 89.28 |
| $SiO_2$ | 3.98 | 2.82 |
| $SO_3$ | 3.84 | 2.04 |
| CaO | 7.71 | 5.85 |
| Total | 100 | 100 |

A series of cement samples were prepared according to Table 5 below. The "A" samples used "impure" GSL brine at 33.2±0.17% weight $MgCl_2$, the "B" samples used "impure" GSL brine diluted to 28.9±0.15% weight $MgCl_2$, the "C" Series used "pure" brine at 28.9±0.15% weight $MgCl_2$, and the "D" series used "impure" GSL brine diluted to 20±0.11% weight $MgCl_2$.

TABLE 5

| Sample | Brine (% wt. $MgCl_2$) | MgO Powder (lbs/gal Brine) | gm/L | Molar Ratio MgO:$MgCl_2$:$H_2O$ |
|---|---|---|---|---|
| A1 | 33.2 ± 0.17 | 7.5 | 898.74 | 4.96:1:10.64 |
| A2 | 33.2 ± 0.17 | 8 | 958.65 | 5.29:1:10.64 |
| A3 | 33.2 ± 0.17 | 9 | 1078.45 | 5.95:1:10.64 |
| A4 | 33.2 ± 0.17 | 10 | 1198.3 | 6.61:1:10.64 |
| A5 | 33.2 ± 0.17 | 11 | 1318.1 | 7.27:1:10.64 |
| B1 | 28.9 ± 0.15 | 7.5 | 898.74 | 5.75:1:13 |
| B2 | 28.9 ± 0.15 | 8 | 958.65 | 6.13:1:13 |
| B3 | 28.9 ± 0.15 | 9 | 1078.45 | 6.90:1:13 |
| B4 | 28.9 ± 0.15 | 10 | 1198.3 | 7.66:1:13 |
| B5 | 28.9 ± 0.15 | 11 | 1318.1 | 8.43:1:13 |
| C1 | 28.9 ± 0.15 | 7.5 | 898.74 | 5.75:1:13 |
| C2 | 28.9 ± 0.15 | 8 | 958.65 | 6.13:1:13 |
| C3 | 28.9 ± 0.15 | 9 | 1078.45 | 6.90:1:13 |
| C4 | 28.9 ± 0.15 | 10 | 1198.3 | 7.66:1:13 |
| C5 | 28.9 ± 0.15 | 11 | 1318.1 | 8.43:1:13 |
| D5 | 20 ± 0.11 | 11 | 1318.1 | 13.31:1:21.14 |

Through a series of SEM micrographs, x-ray-spectra, and strength tests on the samples, it was determined that cements made from MgO and $MgCl_2$ brines set predominately from the 5 phase reaction. The setting time was determined to be less than 4 hrs, however the setting reaction continued for up to 72 hours at an ever-slower rate. After 24 hours of setting, the cements have substantial strengths. Cements with ratios that are stoichiometric with the 5-phase reaction were the strongest observed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for forming a cementitious composition, the method comprising
providing a first volume of a magnesium chloride (MgCl$_2$) brine solution, the brine solution having a specific gravity in the range from about 27° Baume to about 34° Baume; and
providing a second volume of a magnesium oxide (MgO) composition, the second volume and the first volume having a weight ratio that is based upon their respective concentrations and is selected to provide sufficiently stoichiometric ratios of MgCl$_2$, MgO, and H$_2$O to preferably form a magnesium oxychloride cement composition according to the 5 phase reaction:

$$5MgO + MgCl_2 + 13H_2O \rightarrow 5Mg(OH)_2 \cdot MgCl_2 \cdot 8H_2O;$$
and mixing the first volume with the second volume to form the magnesium oxychloride cement composition.

2. The method of claim 1, wherein the ratio comprises from about 1.1:1 to about 1.9:1 by weight.

3. The method of claim 1, wherein the ratio comprises from about 1.3:1 to about 1.7:1 by weight.

4. The method of claim 1, wherein the magnesium chloride brine solution comprises brine prepared from the Great Salt Lake, having one or more mineral impurities, and having a specific gravity of greater than about 30° Baume.

5. The method of claim 1, wherein:
the first volume comprises at least one gallon of magnesium chloride brine solution having a specific gravity in the range from about 28° Baume to about 34° Baume and;
the second volume comprises from about 7 pounds to about 8 pounds of magnesium oxide (MgO) composition for each gallon of magnesium chloride brine solution.

6. The method of claim 1, wherein the magnesium oxide composition contains salt or mineral impurities other than magnesium oxide, the total amount of the impurities being in the range from about 5% to about 20% of the magnesium oxide cement composition.

7. The method of claim 1, further comprising admixing one or more filler materials with the magnesium oxychloride cement composition.

8. The method of claim 7, wherein the filler comprises a combination of different sized aggregate particles.

9. The method of claim 7, further comprising using the cementitious composition as mortar in construction.

10. The method of claim 7, further comprising applying the cementitious composition as stucco.

11. The method of claim 1, further comprising applying the cementitious composition to a combustible material as a fire proof insulation layer before the cementitious composition sets.

12. The method of claim 11, wherein the act of applying the cementitious composition is performed by spraying, dipping, or brushing the cementitious compound to the combustible material.

13. The method of claim 1, wherein the cementitious composition comprises a traffic marking paint and the method further comprises admixing a pigment with the cementitious compound before it sets and applying the unset cementitious compound to a paved surface.

14. The method of claim 1, further comprising:
mixing the first volume with the second volume from about one minute to about seven minutes to form the magnesium oxychloride cement composition;
admixing one or more filler materials with the magnesium oxychloride cement composition before the magnesium oxychloride cement composition sets.

15. A method for forming a cementitious composition, the method comprising
providing a first volume of a magnesium chloride (MgCl$_2$) brine solution; and
providing a second volume of a magnesium oxide (MgO) composition, the second volume and the first volume having a weight ratio that is based upon their respective concentrations and is selected to provide sufficiently stoichiometric ratios of MgCl$_2$, MgO, and H$_2$O to preferably form a magnesium oxychloride cement composition comprising at least about 80% of the 5 phase compound:

$$5MgO + MgCl_2 + 13H_2O \rightarrow 5Mg(OH)_2 \cdot MgCl_2 \cdot 8H_2O;$$
and providing one or more fillers.

16. The method of claim 15, wherein the magnesium oxychloride cement composition comprises at least about 90% of the 5 phase compound.

17. The method of claim 15, wherein the magnesium oxychloride cement composition comprises at least about 90% of the 5 phase compound.

18. A method for forming a cementitious composition, the method comprising
providing a first volume of a magnesium chloride (MgCl$_2$) brine solution; and
providing a second volume of a magnesium oxide (MgO) composition, the second volume and the first volume having a weight ratio that is based upon their respective concentrations and is selected to provide sufficiently stoichiometric ratios of MgCl$_2$, MgO, and H$_2$O to preferably form a magnesium oxychloride cement composition according to the 5 phase reaction:

$$5MgO + MgCl_2 + 13H_2O \rightarrow 5Mg(OH)_2 \cdot MgCl_2 \cdot 8H_2O;$$
and mixing the first volume with the second volume from about one minute to about seven minutes to form the magnesium oxychloride cement composition.

19. The method of claim 16, further comprising admixing one or more filler materials with the magnesium oxychloride cement composition subsequent to the mixing but before the magnesium oxychloride cement composition sets.

20. The method of claim 16, wherein the mixing occurs from about five minutes to about seven minutes.

* * * * *